July 4, 1933.　　　G. C. KAUFFMAN ET AL　　　1,916,225

FASTENING DEVICE

Filed June 25, 1932　　　2 Sheets-Sheet 1

INVENTORS
George C. Kauffman and
Edward J. Gallagher 3rd
BY
Augustus B. Stoughton
ATTORNEY.

WITNESS:
Robt R Kitchel

July 4, 1933.  G. C. KAUFFMAN ET AL  1,916,225
FASTENING DEVICE
Filed June 25, 1932  2 Sheets-Sheet 2

INVENTORS
George C. Kauffman and
Edward J. Gallagher 3rd
BY
Augustus B. Stoughton.
ATTORNEY.

WITNESS:

Patented July 4, 1933

1,916,225

UNITED STATES PATENT OFFICE

GEORGE C. KAUFFMAN, OF PHILADELPHIA, AND EDWARD J. GALLAGHER, 3D, OF DOYLESTOWN, PENNSYLVANIA

FASTENING DEVICE

Application filed June 25, 1932. Serial No. 619,209.

The principal objects of the present invention are to provide for protecting cut-out electric meters and thus preventing the theft of current; and to provide a protected fastening device for the use indicated as well as for other uses and which can be opened only magnetically through a diamagnetic cover or housing which mechanically protects, conceals and encloses the working or vital parts of the device.

Generally stated, the invention comprises a bolt or catch element of magnetic material and a diamagnetic housing in which the bolt or catch element is enclosed and protected from unauthorized manipulation and through which it can be magnetically protected for movement.

The invention also comprises the improvements to be presently described and finally claimed.

In the following description reference will be made to the accompanying drawings forming part hereof and in which Figure 1 is a front elevational view of a fuse plug embodying features of the invention and such as is employed for interrupting service or supply of current to a customer.

Figure 1:
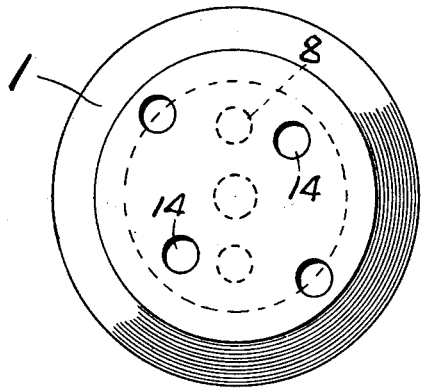
Figure 2:
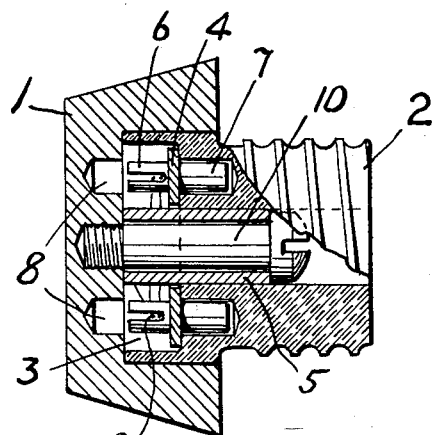
Fig. 2 is a side view, partly in central section, of the same.
Figure 4:
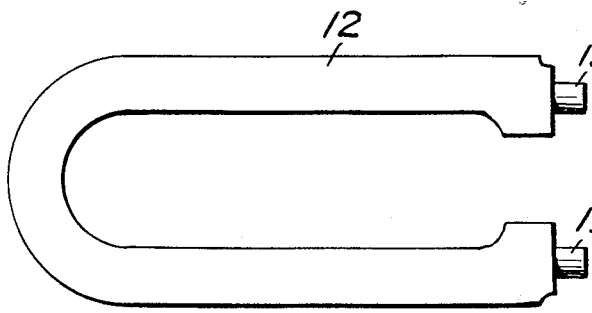
Fig. 4 is a view illustrative of magnetic means for operating the device shown in Figs. 1 to 3.
Figure 3:
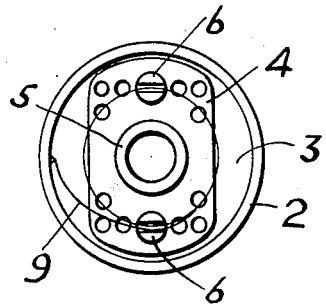
Fig. 3 is an end view with the cap or handpiece, shown at the left in Fig. 2, removed.
Figure 5:
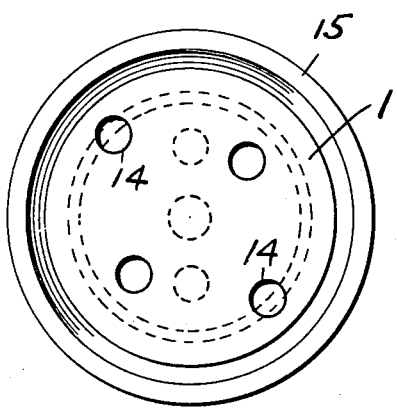
Figs. 5 and 6 are front and sectional views illustrative of a modification in which the device can be operated only by an electromagnetic tool.

In the drawings, more particularly Figs. 1 to 7, 1 and 2 are the segments or parts of a fastening device having an enclosed internal cavity 3 and of which one part is threaded and of which the other part 1 is of diamagnetic material. 4 is a bolt or latch element of magnetizable material, and it is movably enclosed in the cavity 3 and adapted to occupy positions for connecting and disconnecting said parts 1 and 2, and to be put in one of said positions when magnetized. As shown, the bolt 4 is movable on a support of diamagnetic material 5, immovably connected with the part 2, and it is provided with oppositely extending pins 6 and 7. The pins 7 are movable in sockets provided in the part 2, and the pins 6 are movable into and out of engagement with sockets 8 provided on the inside of the part 1. 9 is a spring operative to push and hold the locking member normally out of engagement with the sockets 8 and in the position shown in Fig. 2. A screw or stud 10 serves to secure the parts 1 and 2 together but in rotatable relation so that, as shown in Fig. 2, the part 1 can be freely rotated without rotation of the part 2. It will be seen later that when the device is in use the stud 10 and part 2 and all of the other parts except the part 1 are entirely inaccessible so that all that can be done from the outside is to freely rotate the part 1 without disturbing any of the other parts.

Figure 6:
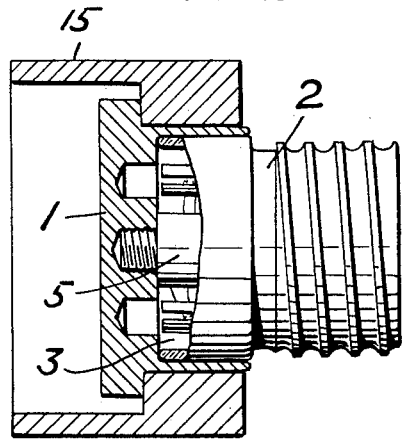
Figure 7:
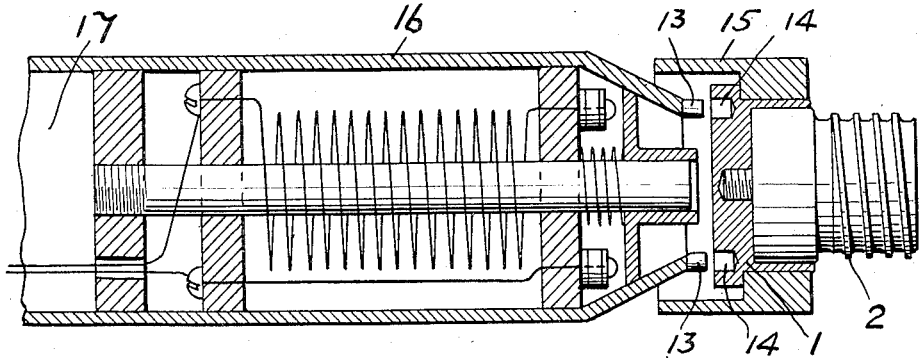
Fig. 7 is a view, principally in section, illustrative of the magnetic tool for operating the device shown in Fig. 6.

In one use of the device described its thread is screwed into a corresponding thread extending through a wall as 11 of a cut-out meter box. It is well understood that a fuse plug to be effective to cut off current should remain in that position against all attacks or tampering from the outside. To insert the fuse plug or to remove it, authorized persons or employees are provided with a permanent magnet 12 having projecting pins 13, and when the pins 13 are applied to pits 14 on the face of the part 1, the bolt 4 is attracted toward the magnet and into the position for causing the pins 6 and 7 to interconnect the parts 1 and 2, so that by turning the magnet the device as a whole can be mounted through and dismounted from the wall 11. The permanent magnet 12 may of course be housed in a suitable handle so that it will look like an ordinary spanner tool. The parts of the device may be so constructed that a permanent magnet exceeding in strength those readily obtainable must be employed, so that even with an ordinary permanent magnet the device may not be removed or unscrewed. To add to the protective features of the device a shade ring of magnetizable material 15 may be mounted around the diamagnetic part 1 of the device, as shown in Fig. 6. In this case a permanent magnet, as 12, is useless for attracting the bolt or lock element 4. An electro-magnet 16, as shown in Fig. 7, is effective because it has but one pole in the neighborhood of the pins 13. A battery for energizing the electro-magnet may be arranged in the compartment 17, so that the electro-magnet may comprise a portable tool.

Figures 8, 9:
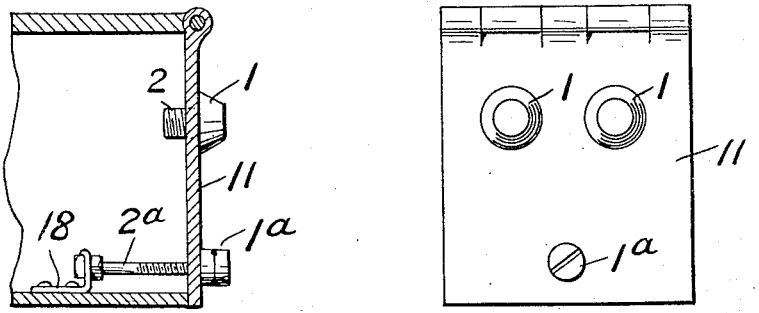
Fig. 8 is a diagrammatic sectional view showing parts of the box of a cut-out electric meter with features of the invention in application thereto.
Fig. 9 is a front view of the same.
Figures 10, 11, 12:
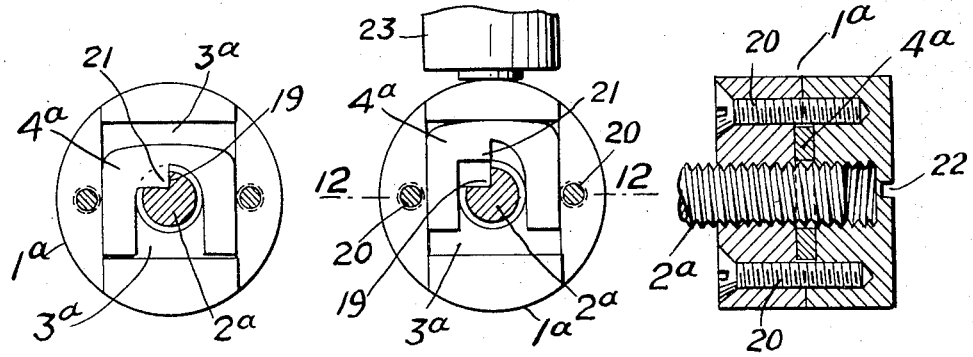
Fig. 10 is a view, partly in section, looking at the face of the part shown at the righthand side in Fig. 12.
Fig. 11 is a similar view showing the application of a magnet and illustrating a different position of the parts.
Fig. 12 is a transverse sectional view of the fastening device shown at the lower righthand portion of Fig. 8.

To attain all the objects set forth and to prevent access to the interior of the meter cut-out box, use may be made of a modified form of fastening device which will be described. If access is had to the interior of the box, theft may be accomplished by putting in a jumper. Referring to Figs. 8 and 12, 2ª is the threaded element of the fastening device and it is secured within the interior of the box, for example, by means of the bracket 18. The threaded end of the part 2ª projects through a hole in the hinged box lid 11, and it is provided with a radial groove 19. The diamagnetic element of the fastening device 1ª is made of two parts providing a cavity 3ª, and these parts are shown as secured together by screws 20 of which the heads are protected by the wall 11 of the box. Within the cavity 3ª there is a slidable catch or bolt element 4ª, shown as of U shape and provided with a detent or tooth 21 adapted to engage the notch or groove 19 and so prevent relative motion of the part 1ª in a direction for screwing it off of the part 2ª. However, it does not prevent rotation in a direction for screwing the part 1ª onto the part 2ª. The part 1ª is shown as provided with a notch 22 for cooperation with a screw driver. It will be observed that the element 4ª as well as the end of the element 2ª are enclosed, concealed and protected by the element 1ª. To fasten the hinged door 11, the part 1ª is screwed onto the part 2ª, and when this is done, the part 1ª can be released only by means of a magnet as 23, which draws the locking element 4ª into the position shown in Fig. 11, whereupon the element 1ª can be backed off and the door 11 opened.

The bolt element may well be made of stainless steel to avoid possibility of rusting, and the spring 9 may well be made of an appropriate bronze for the same purpose.

It will be obvious to those skilled in the art to which the invention relates that modifications may be made in details of construction and arrangement and matters of mere form without departing from the spirit of the invention which is not limited to such matters or otherwise than the prior art and the appended claims may require.

We claim:

1. In a fastening device the combination of a fastening element of diamagnetic material and adapted for manual turning movement, a threaded element in respect to which the diamagnetic element is turnable, locking means encased by said elements and including a magnetizable bolt element adapted to connect and disconnect said elements.

2. In a fastening device the combination of a turnable hand piece of diamagnetic material, an element in respect to which the hand piece is turnable, locking means encased by said element and hand piece and including a bolt element of magnetizable material adapted to cooperate with said elements to release them when magnetized through the diamagnetic material, and means on said hand piece and on said first mentioned element for cooperation with said bolt element.

3. A segmental fastening device having a closed internal cavity and of which one part is threaded and of which the other part is of diamagnetic material, in combination with locking means including a magnetizable bolt element movably enclosed in the cavity and adapted to occupy positions for connecting and disconnecting said parts and to be put into one of said position when magnetized through the diamagnetic material, and means on said parts for cooperation with said bolt element.

4. In a fastening device the combination of a turnable hand piece of diamagnetic material provided with tool receiving depressions, an element in respect to which the hand piece is turnable, locking means including a bolt element of magnetizable material encased in the hand piece and adapted to be magnetized by a magnetic spanner tool, and means on said hand piece and on said first mentioned element for cooperation with said bolt element.

5. In a fastening device the combination of two members which when assembled are capable of relative turning movement and having means which cooperate with a bolt to oppose such relative movement, said members including a closed cavity having a wall of diamagnetic substance, and a magnetic bolt encased in said cavity and protected from unauthorized manipulation by the diamagnetic wall and which can be magnetically operated through the diamagnetic substance of said wall.

6. In a locking device the combination of two members which when assembled are capable of relative turning movement and of which at least one is of diamagnetic substance, locking means enclosed by said members and including a bolt of magnetic material protected from unauthorized manipulation by the diamagnetic substance and adapted to be magnetically operated through the diamagnetic substance to connect and disconnect said members, and means on said members for cooperation with said bolt.

7. In a fastening device, the combination of a fastening element of diamagnetic material adapted for manual turning movement, a threaded element in respect to which said diamagnetic element is turnable, a magnetizable bolt encased by said elements and adapted to disconnect and to connect said elements, means on said elements for cooperation with said bolt, and a spring normally urging said bolt toward disconnecting position.

8. In a fastening device, the combination of a fastening element of diamagnetic material adapted for manual turning movement, a threaded element in respect to which the diamagnetic element is turnable, a shade ring of magnetizable material surrounding said fastening element, a magnetizable bolt encased by said elements and adapted to connect and disconnect said elements, and means on said elements for cooperation with said bolt.

GEORGE C. KAUFFMAN.
EDWARD J. GALLAGHER, 3RD.